(12) United States Patent
Wolgamott et al.

(10) Patent No.: US 9,891,087 B2
(45) Date of Patent: Feb. 13, 2018

(54) MASS AIRFLOW SENSOR FOR INTERNAL COMBUSTION ENGINES

(71) Applicants: Nikolas James Wolgamott, Grand Ledge, MI (US); Robert Pierce, III, Eaton Rapids, MI (US)

(72) Inventors: Nikolas James Wolgamott, Grand Ledge, MI (US); Robert Pierce, III, Eaton Rapids, MI (US)

(73) Assignee: Supertrapp Industries, Inc., Cleveland, OH (US)

( * ) Notice: Subject to any disclaimer, the term of this patent is extended or adjusted under 35 U.S.C. 154(b) by 168 days.

(21) Appl. No.: 14/921,093

(22) Filed: Oct. 23, 2015

(65) Prior Publication Data

US 2016/0116320 A1   Apr. 28, 2016

Related U.S. Application Data

(60) Provisional application No. 62/069,459, filed on Oct. 28, 2014.

(51) Int. Cl.
   *G01F 1/88*    (2006.01)
   *G01F 15/00*   (2006.01)
   *G01F 1/684*   (2006.01)
   *G01F 5/00*    (2006.01)

(52) U.S. Cl.
   CPC ............ *G01F 15/00* (2013.01); *G01F 1/6842* (2013.01); *G01F 5/00* (2013.01)

(58) Field of Classification Search
   CPC ........... G01F 15/00; G01F 1/6842; G01F 5/00
   See application file for complete search history.

(56) References Cited

U.S. PATENT DOCUMENTS

| | | |
|---|---|---|
| 4,366,704 A | 1/1983 | Sato et al. |
| 5,048,327 A | 9/1991 | Atwood |
| 5,179,858 A | 1/1993 | Atwood |
| 5,383,356 A | 1/1995 | Zurek et al. |
| 5,481,925 A | 1/1996 | Woodbury |
| 5,581,026 A | 12/1996 | Sawada et al. |
| 6,018,994 A | 2/2000 | Yonezawa et al. |
| 6,101,869 A | 8/2000 | Kadohiro et al. |
| 6,467,359 B1 * | 10/2002 | Atwood ............... G01F 1/44 73/861.52 |
| 6,701,781 B1 | 3/2004 | Lutowsky, Jr. et al. |
| 6,715,367 B1 * | 4/2004 | Gonzales ............. G01F 1/44 73/861.52 |

(Continued)

*Primary Examiner* — Francis Gray
(74) *Attorney, Agent, or Firm* — Fay Sharpe LLP

(57) ABSTRACT

A mass airflow measuring device includes an air passageway defined in a duct. A first channel communicates with the air passageway via at least one first aperture to allow air flowing through the air passageway to enter the first channel. A second channel is located downstream from the first channel. A sample channel communicates the first channel with the second channel. A mass airflow sensor is located in the sample channel and is adapted to receive air flowing in the sample channel. The sample channel is defined in a housing which has a chamber adapted to accommodate one of a variety of differently configured mass airflow sensors. The sensor is adapted to output an airflow signal based on air flowing past the sensor. A processing unit communicates with the sensor and is adapted to receive the airflow signal from the sensor.

20 Claims, 8 Drawing Sheets

(56) References Cited

U.S. PATENT DOCUMENTS

| | | |
|---|---|---|
| 6,865,957 B1 | 3/2005 | Hughes et al. |
| 7,280,927 B1 | 10/2007 | Dmytriw |
| 7,281,511 B2 | 10/2007 | Quezada |
| 7,484,425 B2 | 2/2009 | Hughes et al. |
| 8,286,506 B2 | 10/2012 | Speldrich |
| 2004/0055375 A1* | 3/2004 | Zurek .................. G01F 1/6842 73/204.12 |
| 2004/0204871 A1 | 10/2004 | Frie et al. |
| 2007/0021049 A1* | 1/2007 | Bender ................ G01F 1/6842 454/141 |
| 2008/0053196 A1 | 3/2008 | Fraden |
| 2013/0055799 A1 | 3/2013 | Tsujii |
| 2015/0114098 A1* | 4/2015 | Kamiya .................. F02D 41/18 73/114.34 |
| 2016/0116320 A1 | 4/2016 | Wolgamott et al. |

\* cited by examiner

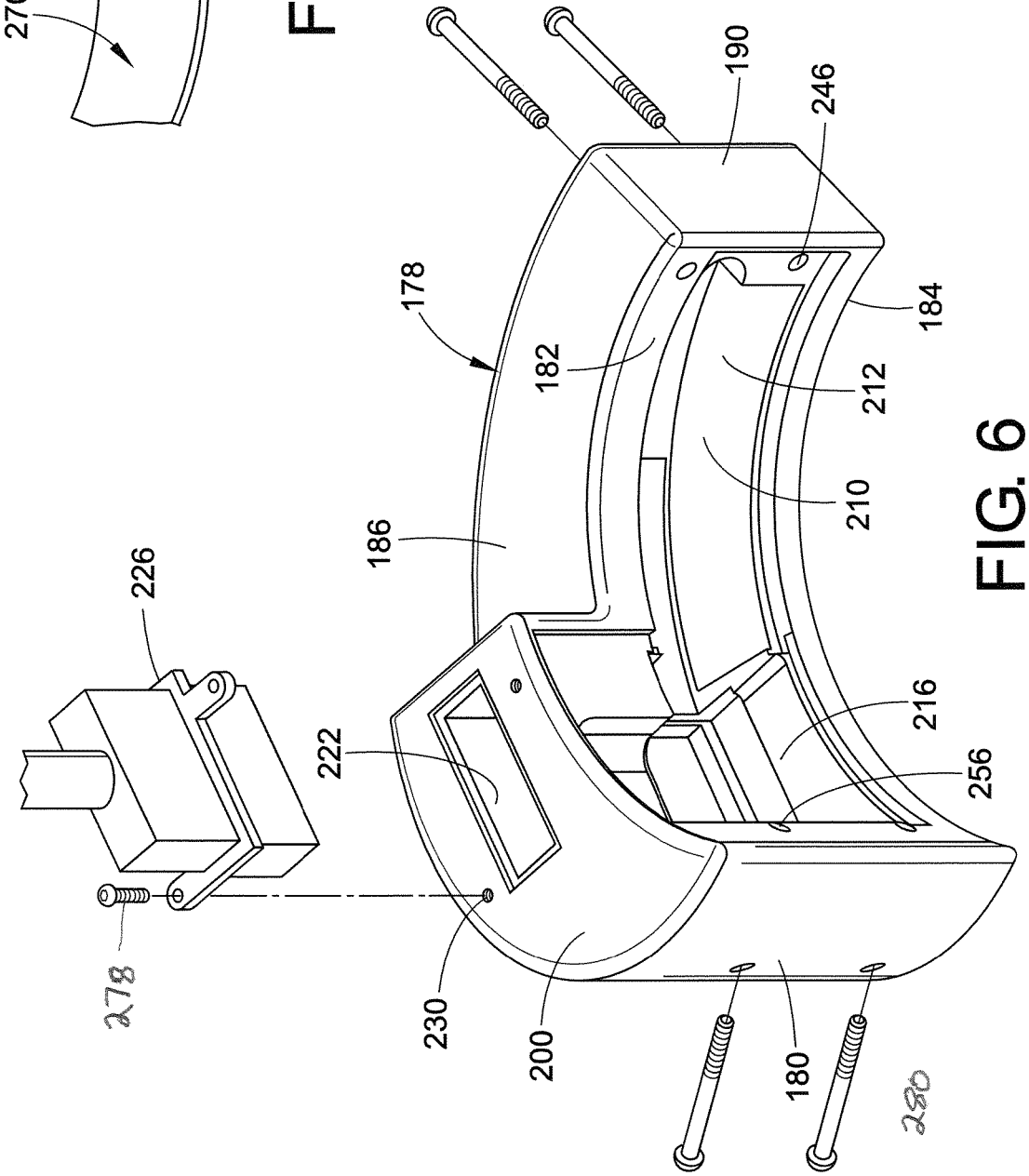

MASS AIRFLOW SENSOR FOR INTERNAL COMBUSTION ENGINES

This application claims the benefit of Provisional Application Ser. No. 62/069,459 which was filed on Oct. 28, 2014. The entire content of that application is incorporated hereinto by reference.

BACKGROUND

The present disclosure is directed to airflow measuring devices. More particularly, it is directed to an airflow sensor housing used to measure mass airflow in internal combustion engines.

It has been considered important to measure the flow of mass air inducted into an internal combustion engine, in order to control the air to fuel ratio of the engine. Accurate measurement of airflow is important for correctly monitoring engine parameters and emission controls. To comply with emission requirements for motor vehicles, a specific air fuel ratio must be precisely maintained. This requires the use of sensors which accurately record the actual air mass flow and output this information in the form of electrical signals to the control electronics of the engine. A mass airflow sensor provides information necessary for the engine control unit to balance and deliver the correct fuel mass to the engine. The mass airflow sensor is located in the intake air stream and measures the mass of air entering the engine.

Two known types of mass airflow sensors used for this purpose are vane meter sensors and hot wire sensors. Hot wire mass airflow sensors are now more common. In such a sensor, the wire is so positioned that the air flowing to the engine flows around the wire. As airflows past the wire, it cools, decreasing its resistance. This allows more current to flow through the circuit or causes a smaller voltage drop over the wire, depending on whether the system employs constant voltage over the wire or constant current through the wire. The current or voltage drop is proportional to the mass of air flowing past the wire. An integrated electronic circuit converts the measurement into a calibrated signal which is sent to the engine control unit of the internal combustion engine. Air mass flow in the internal combustion engine is measured along with atmospheric pressure and air temperature so that the quantity of fuel injected can be calibrated to the current power requirements of the engine.

Precise measurement of airflow is not only important in modern engine control systems but also in testing systems. It is known to mount a mass airflow sensor directly on a main venturi member of an air intake system employed for an internal combustion engine. The main venturi member has a bypass passage connected at its downstream end to a low pressure region connected at the narrowed portion of the venturi. The sensing elements of the mass airflow sensor are disposed in this bypass passage and measure airflow therethrough.

It is also known to mount an airflow sensor directly to a sensor housing, which forms part of the air intake or air induction system of an internal combustion engine, with the sensor housing having a main airflow passageway and a smaller diameter airflow passageway offset to one side of the main passageway. The sensing head of a mass airflow sensor can extend into the smaller diameter airflow channel and detect airflow therethrough.

Both of these known systems have disadvantages in that they cannot be adapted to accurately measure airflow in larger sized internal combustion engines. Present airflow measurement systems for engines are limited by size, accuracy and signal noise. Difficulties occur in accurately measuring mass airflow in larger internal combustion engines. For example, larger commercial engines for engine control and emission systems or testing facilities require accurate measurement of mass airflows greater than 3,000 kilograms per hour.

It would be advantageous to provide an improved mass airflow measurement system or device which can be employed on large internal combustion engines. It would also be advantageous to provide a mass airflow sensor which accommodates turbulent airflow caused by devices located immediately upstream from the sensor, such as elbows, remote air cleaners, superchargers, and other upstream structures in the air intake section of the engine which contribute to turbulent airflow.

Mass airflow sensors for use on internal combustion engines are produced by several different manufacturers, including e.g. Hitachi Automotive Systems, Bosch, and Siemens among others. Such mass airflow sensors are each sized somewhat differently from one another. Thus, different housings are currently needed for each such mass airflow sensor. It would be advantageous to provide a single airflow measuring housing which can accommodate the mass airflow sensors of many different manufacturers and would provide accurate readings, even when employed with large internal combustion engines.

BRIEF DESCRIPTION

In accordance with one embodiment of the present disclosure, a mass airflow measuring device comprises an air passageway defined in a duct and a first channel communicating with the air passageway via at least one first aperture to allow air flowing through the air passageway to enter the first channel. A second channel is located downstream from the first channel. A sample channel communicates the first channel with the second channel. A mass airflow sensor is located in the sample channel and is adapted to receive air flowing in the sample channel. The sensor is adapted to output an airflow signal based on air flowing past the sensor. A processing unit communicates with the sensor and is adapted to receive the airflow signal from the sensor. The sample channel is adapted to accommodate one of several differently configured mass airflow sensors and includes a housing comprising a chamber configured to accommodate the one of the several differently configured mass airflow sensors.

In accordance with another embodiment of the present disclosures, a mass airflow measuring device comprises an air passageway defined in a duct and a first channel communicating with the air passageway via a plurality of first apertures, the apertures being adapted to allow air flowing through the air passageway to enter the first channel. A second channel is located downstream from the first channel. The second channel communicates with the air passageway via a plurality of second apertures. A housing includes a sample channel which communicates the first channel with a second channel. A mass airflow sensor is located in the sample channel and is adapted to receive air flowing in the sample channel. The sensor is adapted to output an airflow signal based on air flowing past the sensor. A processing unit communicates with the sensor and is adapted to receive the airflow signal and is adapted to output a processed airflow signal. The housing includes a chamber configured to accommodate one of several differently configured mass airflow sensors.

In accordance with yet another embodiment of the present disclosure, there is provided a mass airflow measuring device which comprises a duct comprising an outer surface and an inner surface defining an air passageway. A venturi insert is selectively positionable in the air passageway of the duct. The insert comprises a first annular portion, including a plurality of first through apertures and a first annular groove defined adjacent the first annular portion and communicating with the plurality of first through apertures. A second annular portion is spaced from the first annular portion. A second annular groove is disposed adjacent the second annular portion. A plurality of second through apertures communicates with the second annular groove. A housing is mounted to the duct outer surface. The housing includes a channel that communicates with the first and second annular grooves. The housing defines a chamber for accommodating a mass airflow sensor.

BRIEF DESCRIPTION OF THE DRAWINGS

FIG. 6 is an exploded perspective view of another portion of the device of FIG. 4;

FIG. 7 is a perspective view of an insert which can be selectively placed in a sample channel of the device shown in both FIG. 1 and FIG. 4;

DETAILED DESCRIPTION

Figure 1:
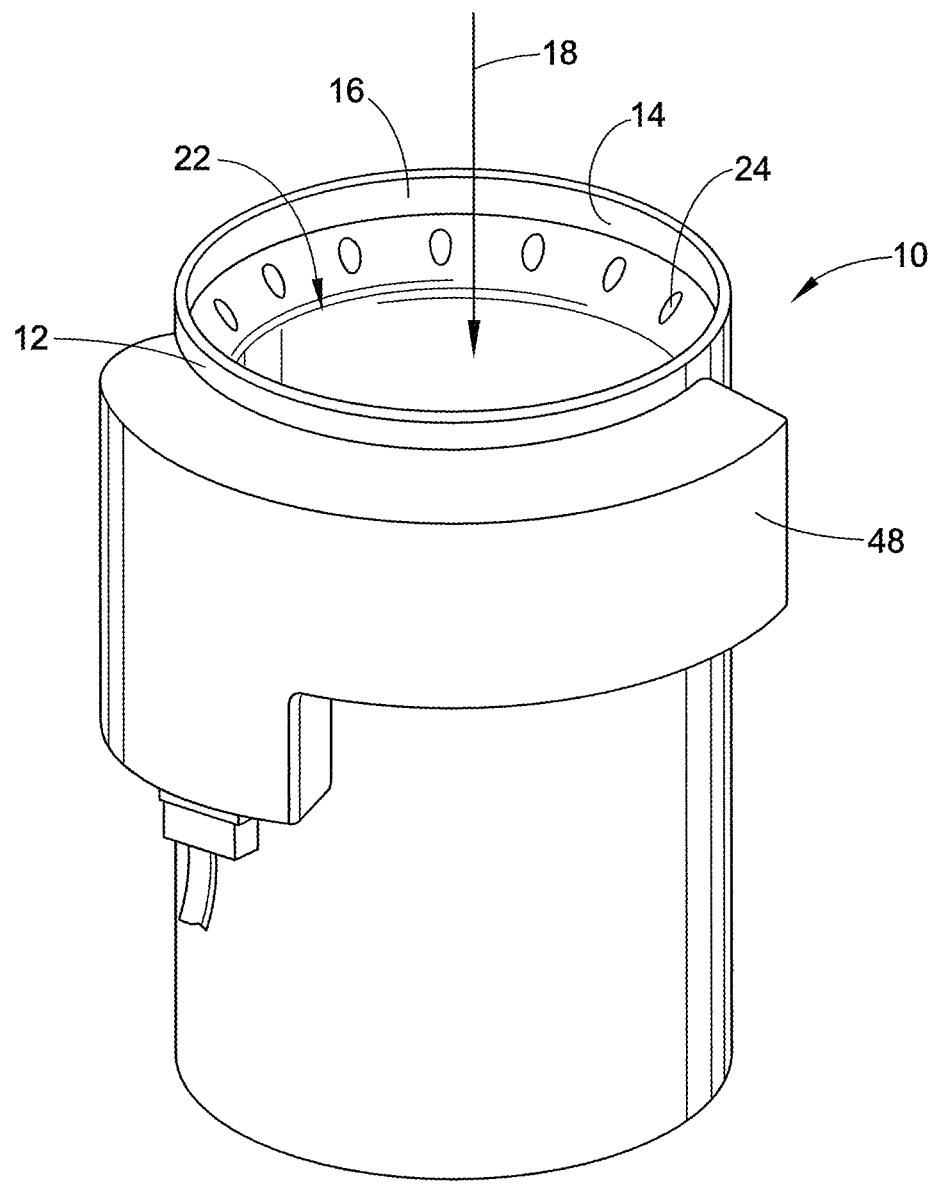
FIG. 1 is perspective view of a mass airflow measuring device according to a first embodiment of the present disclosure.

With reference to FIG. 1, a mass airflow measuring device 10 includes a duct 12 having an inner surface 14. The duct inner surface defines an air passageway 16. It should be appreciated that airflows in a particular direction through the duct as illustrated by arrow 18.

Figure 3:
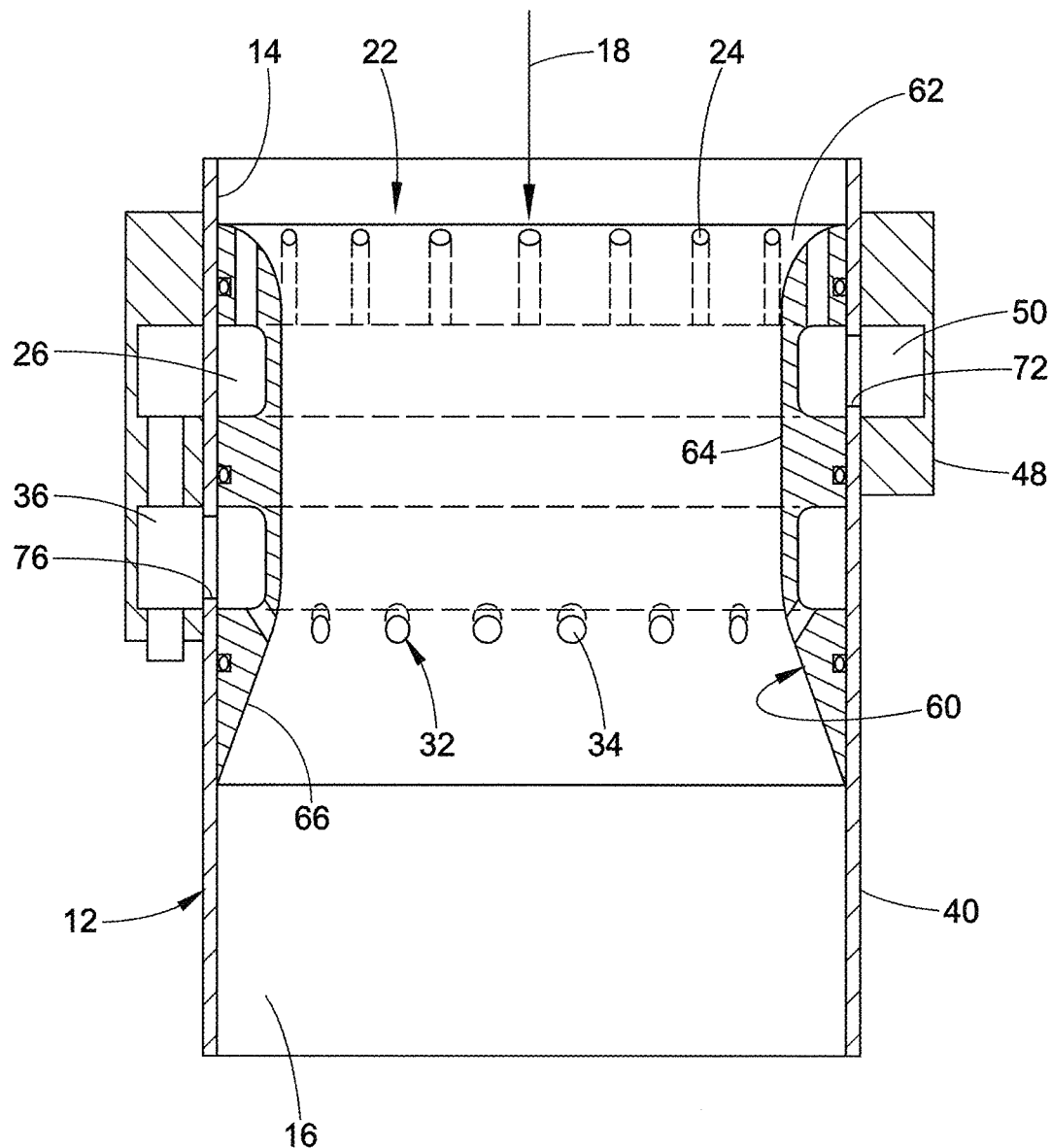
FIG. 3 is a cross-sectional view of the device of FIG. 2 along line 3-3.

Defined in the duct is a first set 22 of apertures 24. It should be appreciated that the apertures 24 are located around the inner surface of the duct. Thus, the first set of apertures are disposed as an annulus around the duct inner surface 14. With reference now also to FIG. 3, also defined in the duct is a second set 32 of apertures 34. The second set of apertures are located downstream from the first set of apertures. The first set of apertures 22 communicates with a first channel 26. The second set of apertures 34 communicates with a second channel 36. The first and second sets of apertures 24 and 34 can be circular. Alternatively, they can be oval.

Positioned on an outer surface 40 of the duct is a housing 48 in which is defined a sample channel 50. The sample channel communicates at a first end 54 thereof with the first channel 26 and communicates at a second end 56 thereof with the second channel 36.

In one embodiment, the first and second channels 26 and 36 are defined in the air passageway 16 by portions of a venturi 60 mounted to the inner surface 14 of the duct. The venturi comprises a convergent airfoil section 62, a relatively straight section 64, and a divergent airfoil section 66. It should be appreciated that because the venturi 60 is received within the duct 12, the air passageway 16 extends through the interior of the venturi 60.

Figure 2:
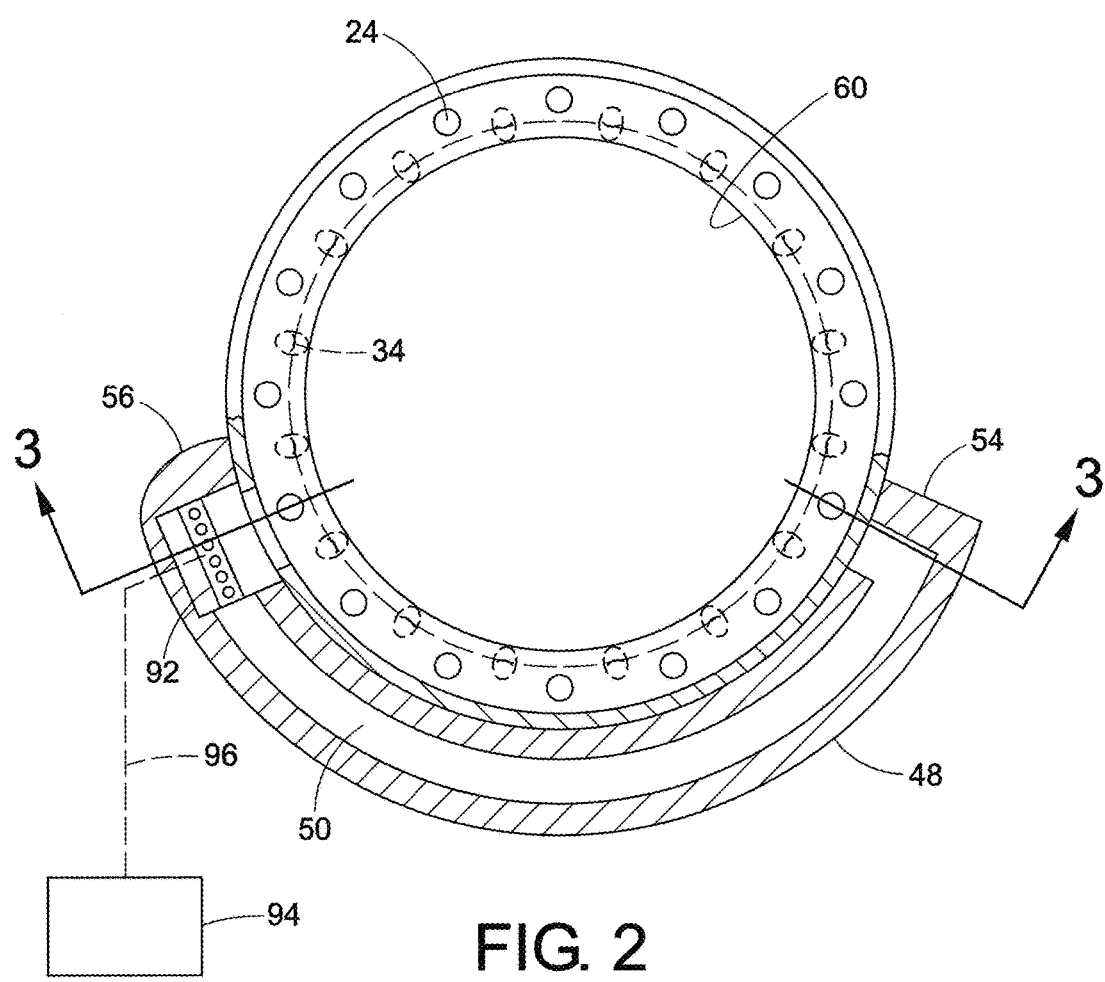
FIG. 2 is a top plan view of the device of FIG. 1.

The first channel 26 can be thought of as an annular static pressure manifold disposed between the wall sections of the venturi 60 and the interior wall or inner surface 14 of the duct. The first set of apertures 24 is disposed in the convergent airfoil section 62 of the venturi 60. These apertures allow air to flow into the first channel 26. The first channel 26 communicates with the sample channel 50 via a first aperture 72 that extends through the duct 12 at a first location around the periphery of the duct. The divergent airfoil section 66 includes the plurality of second apertures 34 and these communicate with the second channel 36. These are located at the edge of a venturi pressure recovery area of the device. The length of the second channel 36 is maximized by its placement along the circumference of the duct 12. The second channel 36 communicates with the sample channel 50 via a second aperture 76 defined in the duct 12. Located in the sample channel 50 is a sensor 92 in the form of a mass airflow sensor (see FIG. 2).

The length of the second channel 36 is maximized in order to promote laminar flow across the sensor or sensing element 92. The longer the channel is, the straighter the air flow will be. The general rule for such measurements is that the length of the flow channel in a tube should be about ten times larger than the diameter of the tube and that a straight tube is needed in order to promote smooth air flow. Thus, if the air flow sensor 92 were to be positioned in a five inch diameter tube, ideally, a fifty inch straight section of such five inch diameter tube should be positioned upstream from the location of the sensor, i.e. where the flow of air is measured. By employing a bypass style of housing, a smaller diameter sensing tube, such as, for example, 0.5 inches for the diameter of the second channel 36, allows adequate length for the second channel in order to promote a laminar flow past the sensor 92.

As air flows into the duct 12, a portion of the air will flow through the first set of apertures 22 and into the first channel 26. From there, the air will flow through the first duct aperture 72 and into the sample channel 50. Air will then flow past the sensor 92 and back into the duct through the second aperture 76 so that the air can be discharged via the second set of apertures 34 back into the duct. As the air flows past the sensor 92, a mass airflow measurement can be made. That information is then transmitted to a processing unit 94 of the control electronics of the internal combustion engine via a path 96 (such as wiring or perhaps even wirelessly). The processing unit is adapted to output a processed airflow signal. That signal can either be a nonlinear signal or a linear signal relative to the airflow received by the mass airflow sensor. The processing unit can determine an average airflow signal from a plurality of airflow reading values received from the mass airflow sensor. The average airflow signal is then transmitted to an engine control unit (not illustrated).

Figure 4:
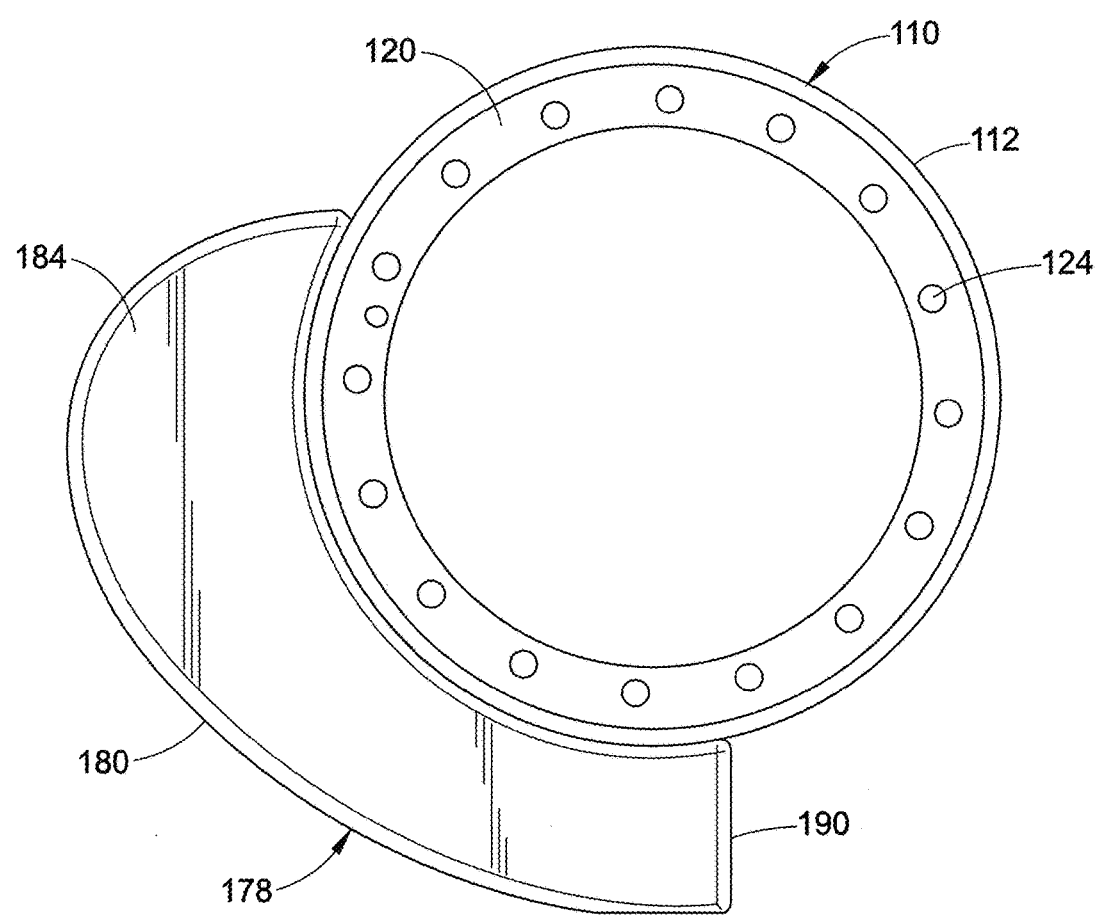
FIG. 4 is top plan view of a mass airflow measuring device according to a second embodiment of the present disclosure.
Figure 5:
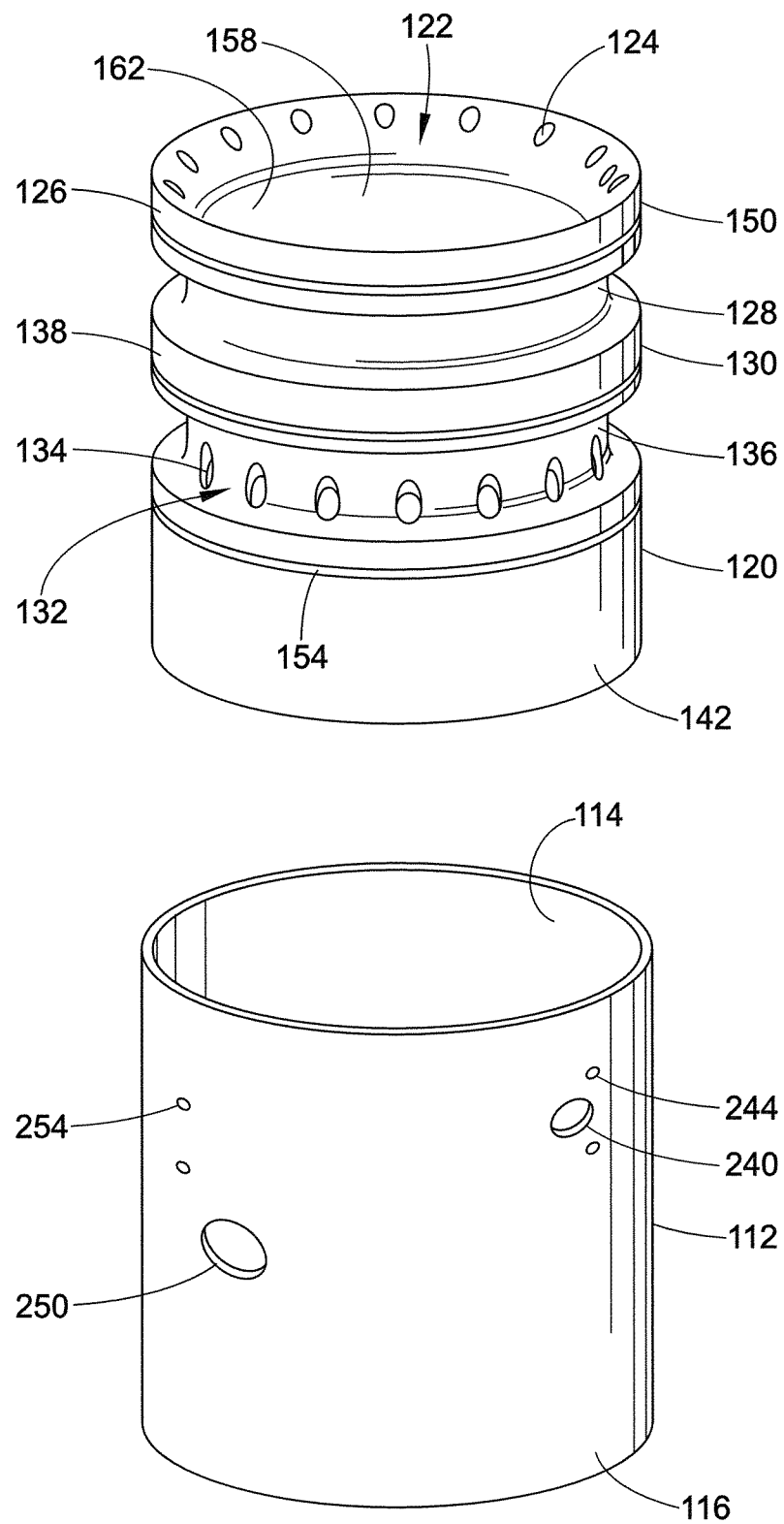
FIG. 5 is an exploded perspective view of a portion of the device of FIG. 4.

With reference now to FIG. 4, disclosed therein is a mass airflow device 110, according to a second embodiment of the present disclosure. The mass airflow device comprises a duct 112 having an inner surface 114 and an outer surface 116, as illustrated in FIG. 5. The duct defines an air passageway. Positionable in the duct is an insert 120. Defined in the insert is an annular set 122 of first apertures 124 with the apertures communicating with a first channel 126. Also defined in the insert is an annular set 132 of second apertures 134. In this embodiment, a second channel 136 is defined between the duct inner surface 114 and an outer surface 138 of the insert 120.

It should be appreciated from FIG. 5 that the insert 120 is also provided with a plurality of spaced annular grooves 150, each of which accommodates a respective sealing ring or O-ring 154. The O-rings serve to at least retard if not prevent airflow between the insert outer surface 138 and the duct inner surface 114 when the insert is mounted in the duct.

Mounted to an outer surface 160 of the duct is a housing 178 as illustrated in FIG. 4. With reference now also to FIG. 6, the housing 178 includes an outer wall 180, an inner wall 182, a top wall 184, a bottom wall 186, and an end wall 190. It should be appreciated that the housing can be made in one embodiment such that it has an enlarged section 200. The enlarged section is sized so as to accommodate a variety of mass airflow sensors of different manufacturers (not illustrated in this embodiment). Defined on the housing inner wall 182 is a large opening 210. In one embodiment, the opening can include a first section 212 of a first width and a second section 216 of a second and larger width. A second opening 222 can be defined in one of the walls of the housing.

It should be appreciated that the large opening 210 in the housing 178 cooperates with the duct outer surface 116 so as to define a sample channel or a flow channel through which air flows towards the sensor so that the mass air flow can be determined. In this embodiment, the opening 222 is defined in the bottom wall 186, particularly in the enlarged section 200 of the housing. The opening 222 is selectively closed by a cover. In one embodiment, an integrated cover and sensor 226 is provided. In this embodiment, the integrated cover and sensor can be selectively attached or secured in place over the opening 222 so as to prepare the mass air flow measuring device for use. Alternatively, the cover can be removed when a separate mass airflow sensor is inserted into the housing and secured in place. Thereafter, the cover is reattached to the housing so as to allow the device to work properly.

With reference now to FIG. 7, for some types of mass airflow sensors, an adaptor or insert 270 may be required. In one embodiment, the insert can comprise a curved body 272. In order to secure the insert in the housing 178, a suitable fastener (not shown) can extend through a fastener aperture, such as at 276. Similar fastener apertures 230, 244, 254 and 256 are used with respective fasteners 278 and 280 to secure the cover 226 to the housing 178 and the housing 178 to the duct 112.

The airflow sensed by the sensor will be proportional to the airflow in the duct. The duct illustrated herein is usually located downstream from an air filter, a super charger, a turbo charger, or the like. Main airflow enters the entrance of the duct and flows therethrough. However, a portion of the airflow will enter the first channel 26 or 126 via the apertures 24 or 124. Such air will then flow into the housing 48 or 178 through the sample channel (such as the second channel 36) and past the respective airflow meter mounted in the housing. At this time, airflow is measured by the mass airflow sensor. Air exiting from the sample channel will then reenter the duct at the second set of apertures 34 and 134.

In this embodiment, the mass airflow sensor communicates directly with the flow of air being supplied to a vehicle engine rather than a diverted air stream. As is conventional with such mass airflow sensors, the sensor directly reads the mass of the airflow. As mentioned, numerous suppliers and types of such sensors are available due to the various makes and models of vehicles employing such sensors. However, the disclosed mass airflow measuring device may be employed or utilized with a broad array of such sensors. That is because the housing disclosed herein can accommodate the sensors of several manufacturers.

Figure 8:
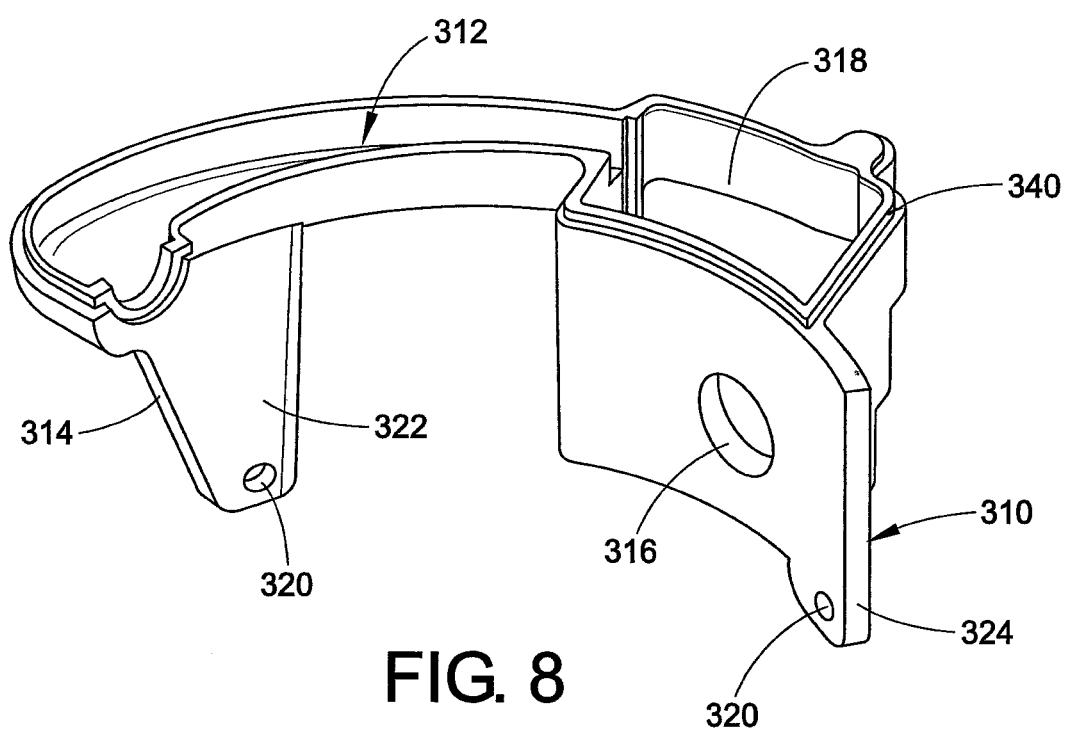
FIG. 8 is a perspective view of a bottom portion of a two part housing of a mass airflow measuring device according to a third embodiment of the present disclosure.

With reference now to FIG. 8, disclosed there is the bottom half of a two part housing of a mass airflow measuring device according to a third embodiment of the present disclosure. The device includes a bottom housing half 310 in which is defined a longitudinally extending channel 312. The channel extends between a first port 314 located at one end of the housing and a second port 316 located at another end of the housing. The second port communicates with an enlarged portion 318 of the channel. The enlarged portion defines part of a chamber which is adapted to accommodate one of several differently shaped or configured sensors (not illustrated) available from various manufacturers. The housing half 310 can be secured via fasteners (not illustrated) extending through apertures 320 in respective first and second flanges 322 and 324 of the housing half to an outer periphery of an airflow duct (not shown) of an internal combustion engine.

Figure 9:
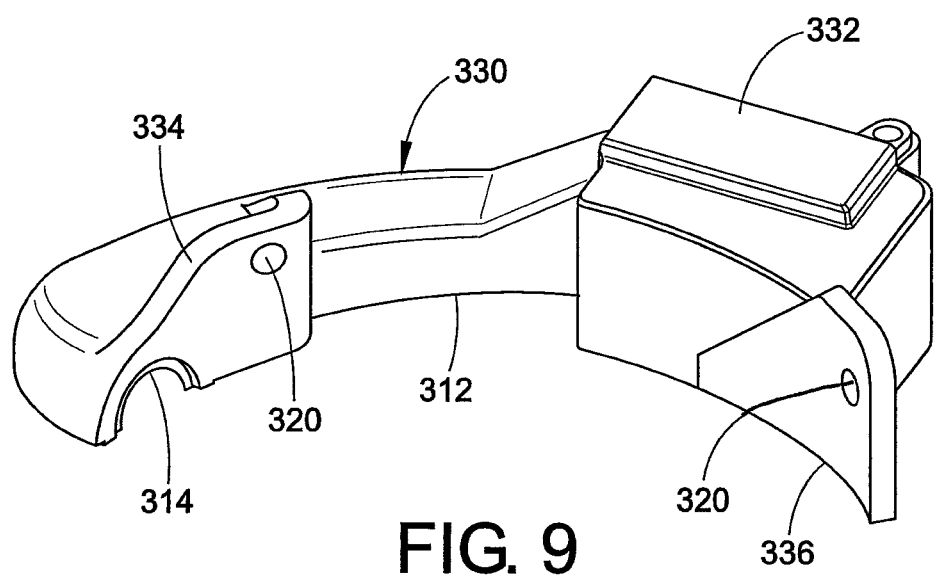
FIG. 9 is a perspective view of a top portion of the two part housing of the mass airflow measuring device of FIG. 8.

With reference now also to FIG. 9, disclosed therein is a top housing half 330 which cooperates with the bottom housing half 310. The two housing halves together define the channel 312. The top housing half 330 also defines a portion of the first port 314. Moreover, the top housing half also includes an enlarged portion 318 which defines part of the chamber that accommodates the sensor. To this end, there is an enlarged section 332 defined in the housing top half. Also defined in the housing top half are suitable apertures 320 in respective first and second flanges 334 and 336 to accommodate fasteners which allow the housing half to be secured to the airflow duct. It should be appreciated that the housing halves 310 and 330 cooperate with each other so as to define between them the channel 312 so that the channel is air tight. To this end, the two housing halves can include mating flanges and grooves, such as, for example, the flange 340 illustrated in FIG. 8. The cooperating groove in the top housing half 330 is not visible. It should be appreciated that the first and second ports 314 and 316 communicate, respectively, with a respective one of the inlet ports and the outlet ports of the venturi device defined or mounted within the duct, such as the venturi device illustrated in FIG. 3 of the instant application.

While several particular designs of a mass airflow sensor housing have been illustrated herein, it should be appreciated that the housing may be constructed to have various sizes and shapes. In the embodiments shown, the housing only extends part way around the outer periphery of the duct. However, other designs are possible. For example, the housing could extend all the way around the periphery of the duct, if so desired. In one embodiment, the housing can have a rounded configuration. In another embodiment, the housing can have a rectangular configuration. Also, the channel defined in the housing can have various shapes and diameters.

It should be appreciated that the mass airflow sensor housing can be made from a variety of known materials by a variety of known manufacturing methods, such as, for example, machining, die casting or molding. The materials from which the housing can be made can include various known metals or alloys, thermoplastic materials or resin materials.

It should also be appreciated that the mass airflow measuring device disclosed herein measures the flow of various fluids. As such, the device is not limited by the type of fluid. Thus, gaseous fluids, such as steam or natural gas, can be measured as well as the intake air of an internal combustion engine.

The device according to the present disclosure allows for changes in dimension such as venturi member length or thickness. Various features can also be changed as required. For example, the number and location of apertures in the venturi device can be changed. The manufacturing process through which the device according to the present disclosure can be made can vary. For example, precision machining could create a product suitable for a lab grade testing calibration master. On the other hand, a known manufacturing process could be employed to create a product which is suitable for mass production.

In the field of truck engines, a large internal combustion engine is considered one which is about 7 liters or larger in displacement. While the present disclosure has discussed airflow measurement particularly useful for large internal combustion engines, it should be appreciated that such engines are not only used on vehicles, but also as stationary engines which are employed in a variety of manufacturing settings. Such engines can either be diesel engines or gasoline engines. Moreover, the engines can be adapted to be powered by compressed natural gas.

Several exemplary embodiments have been described herein. Obviously, modifications and alterations will occur to others upon reading and understanding the preceding detailed description. It is intended that the embodiments be construed as including all such modifications and alterations insofar as they come within the scope of the appended claims or the equivalents thereof.

The invention claimed is:

1. A mass airflow measuring device, comprising
an air passageway defined in a duct;
a first channel communicating with said air passageway via at least one first aperture to allow air flowing through said air passageway to enter the first channel;
a second channel located downstream from the first channel;
a sample channel communicating said first channel with said second channel;
a mass airflow sensor communicating with the sample channel and adapted to receive air flowing in the sample channel, the sensor being adapted to output an airflow signal based on air flowing past the sensor;
a processing unit communicating with the sensor and adapted to receive the airflow signal from the sensor; and,
wherein the sample channel is adapted to accommodate one of several differently configured mass airflow sensors and includes a housing comprising a chamber configured to accommodate the one of the several differently configured mass airflow sensors, wherein the sample channel is positioned radially outwardly of an outer periphery of the duct.

2. The device of claim 1, wherein the processing unit is adapted to output a processed airflow signal.

3. The device of claim 2, wherein the processed airflow signal comprises one of a non-linear signal and a linear signal relative to the airflow received by said mass airflow sensor.

4. The device of claim 2, wherein said airflow signal comprises a plurality of airflow reading values and wherein said processing unit determines an average airflow signal from the plurality of airflow reading values and said processed airflow signal is determined from said average airflow signal.

5. The device of claim 1, further comprising at least one second aperture communicating with said second channel to allow air flowing in the second channel to reenter the air passageway.

6. The device of claim 5, wherein a wall of the second channel defines a venturi member in the air passageway.

7. The device of claim 5, wherein said at least one second aperture comprises a plurality of spaced second apertures.

8. The device of claim 1, wherein the at least one first aperture comprises a plurality of spaced first apertures.

9. The device of claim 8, wherein at least one of said plurality of spaced first apertures is round.

10. A mass airflow measuring device, comprising:
an air passageway defined in a duct;
a first channel communicating with said air passageway via a plurality of first apertures, the apertures being adapted to allow air flowing through said air passageway to enter the first channel;
a second channel located downstream from the first channel, the second channel communicating with said air passageway via a plurality of second apertures;
a housing including a sample channel communicating said first channel with said second channel;
a mass airflow sensor communicating with the sample channel and adapted to receive air flowing in the sample channel, the sensor being adapted to output an airflow signal based on air flowing past the sensor;
a processing unit communicating with the sensor and adapted to receive the airflow signal and adapted to output a processed airflow signal;
wherein the housing includes a chamber configured to accommodate one of several differently configured mass airflow sensors, wherein the chamber and the mass airflow sensor accommodated in it are located radially outward of an outer surface of the duct.

11. The device of claim 10 wherein the housing is mounted to the outside surface of the duct.

12. The device of claim 10 wherein at least one of the plurality of first apertures or of the plurality of second apertures is a round aperture.

13. The device of claim 10 wherein the housing comprises a top half and a bottom half which are mated to each other.

14. The device of claim 10 wherein the housing comprises a top wall, a bottom wall, an outer wall and first and second end walls.

15. The device of claim 10 wherein each of the plurality of first apertures and plurality of second apertures is spaced from each other one of the plurality of first apertures and the plurality of second apertures.

16. The device of claim 10 wherein the second channel is defined in the air passageway.

17. The device of claim 10 wherein the first and second channels are defined in a venturi member that is positioned in the air passageway.

18. The device of claim 11 further comprising an insert adapted to be selectively placed in the housing defining the sample channel.

19. A mass airflow measuring device comprising:
a duct comprising an outer surface and an inner surface defining an air passageway;
a venturi insert selectively positionable in the air passageway of the duct, the insert comprising:
a first annular portion including a plurality of first through apertures, a first annular groove defined adjacent to the first annular portion and communicating with the plurality of first through apertures, a second annular portion spaced from the first annular portion, a second annular groove disposed adjacent the second annular portion, a plurality of second through apertures communicating with the second annular groove; and a housing mounted to the duct outer surface and including a channel communicating with the first and second annular grooves, the housing defining a chamber for accommodating a mass airflow sensor such that the mass airflow sensor is located outside the duct outer surface.

20. The device of claim 1 wherein the chamber and a mass airflow sensor accommodated in it are located radially outwardly of the outer periphery of the duct.

* * * * *